July 14, 1970    G. H. MOYES    3,520,577

HYDRAULIC BRAKING SYSTEMS

Filed Feb. 18, 1969    3 Sheets-Sheet 1

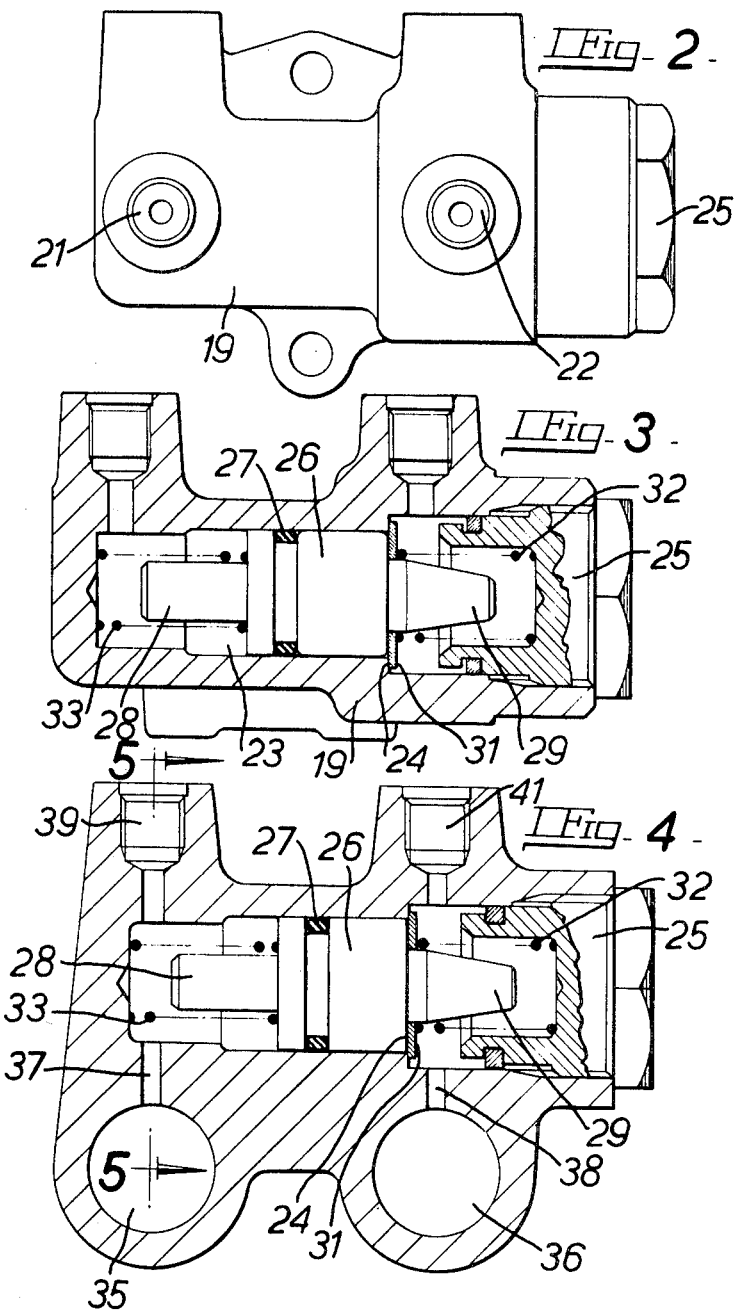

July 14, 1970

G. H. MOYES 3,520,577

HYDRAULIC BRAKING SYSTEMS

Filed Feb. 18, 1969

United States Patent Office 3,520,577
Patented July 14, 1970

3,520,577
HYDRAULIC BRAKING SYSTEMS
Gordon Haswell Moyes, Sutton Coldfield, England, assignor to Girling Limited, Birmingham, England, a British company
Filed Feb. 18, 1969, Ser. No. 800,091
Claims priority, application Great Britain, Feb. 20, 1968, 8,151/68; Aug. 31, 1968, 41,729/68
Int. Cl. B60t *17/18*
U.S. Cl. 303—84                               5 Claims

ABSTRACT OF THE DISCLOSURE

In an hydraulic braking system of the kind in which fluid under pressure is supplied to the slave cylinders of brakes on wheels on opposite sides of a vehicle by separate master cylinders each actuated by its own pedal, cross compensation is provided by a compensating cylinder connected at opposite ends to the outlets of the two master cylinders and a piston working in the compensating cylinder and normally held in a substantially central position against a locating stop by opposed springs.

---

This invention relates to improvements in hydraulic braking systems of the kind in which fluid pressure is supplied to the slave cylinders of brakes on wheels on opposite sides of a vehicle by separate master cylinders each actuated by its own pedal.

Braking systems of this kind are commonly used in agricultural tractors and like vehicles, both pedals being operated simultaneously for retarding the vehicle and the pedals being operable independently to provide differential braking or braking of the wheels on one side only for steering.

Differential braking tends to produce uneven wear of the friction surfaces, and when this has occurred simultaneous operation of the brake pedals will not produce uniform braking of the wheels on both side of the vehicle as the slave cylinders of the brakes on one side will require more hydraulic fluid than those on the other side for uniform application of the brakes.

To overcome this difficulty it is known to connect between the outlets from the master cylinders a compensating cylinder in which works a piston exposed at opposite ends to the pressures applied to the brakes on opposite sides of the vehicle. An increased pressure on one side of the piston moves it axially to displace fluid on the other side so that equal volumes of fluid are delivered to the slave cylinders on the two sides.

According to our invention a compensator for an hydraulic braking system of the kind set forth comprises a compensating cylinder connected at opposite ends to the outlets from two master cylinders, and a piston working in the cylinder and normally held in a substantially central position by opposed springs which hold it in engagement with a locating stop, the piston being free to move in either direction against resilient resistance under differential fluid pressures in opposite ends of the cylinder.

The piston may be provided with an O-ring or equivalent seal and with an axially extending spigot on each end, the axial length of the piston over the spigots being such in relation to the axial length of the cylinder that the piston can only move through a limited distance in either direction, and the brakes on one side of the vehicle are still effective in the event of a failure of a pipe line or other part of the hydraulic system on the other side.

Alternatively the O-ring or other seal on the piston may be omitted in order to reduce friction, in which case the spigots extending from opposite ends of the piston are provided with closure means adapted to close off one or other of two ports or passages in opposite ends of the cylinder connected to the master cylinders when one master cylinder is operated alone.

Figure 1:
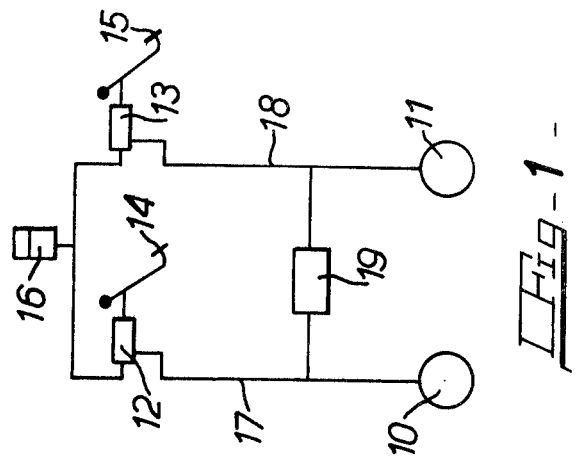
Figure 6:
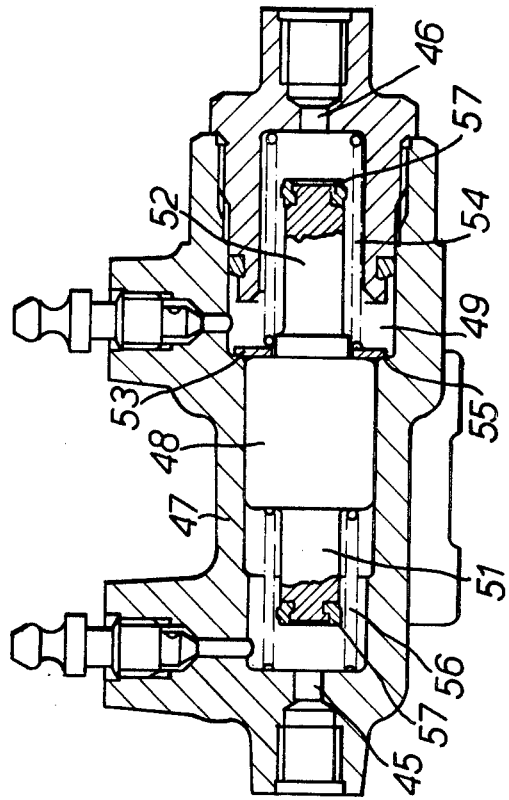
Figure 5:
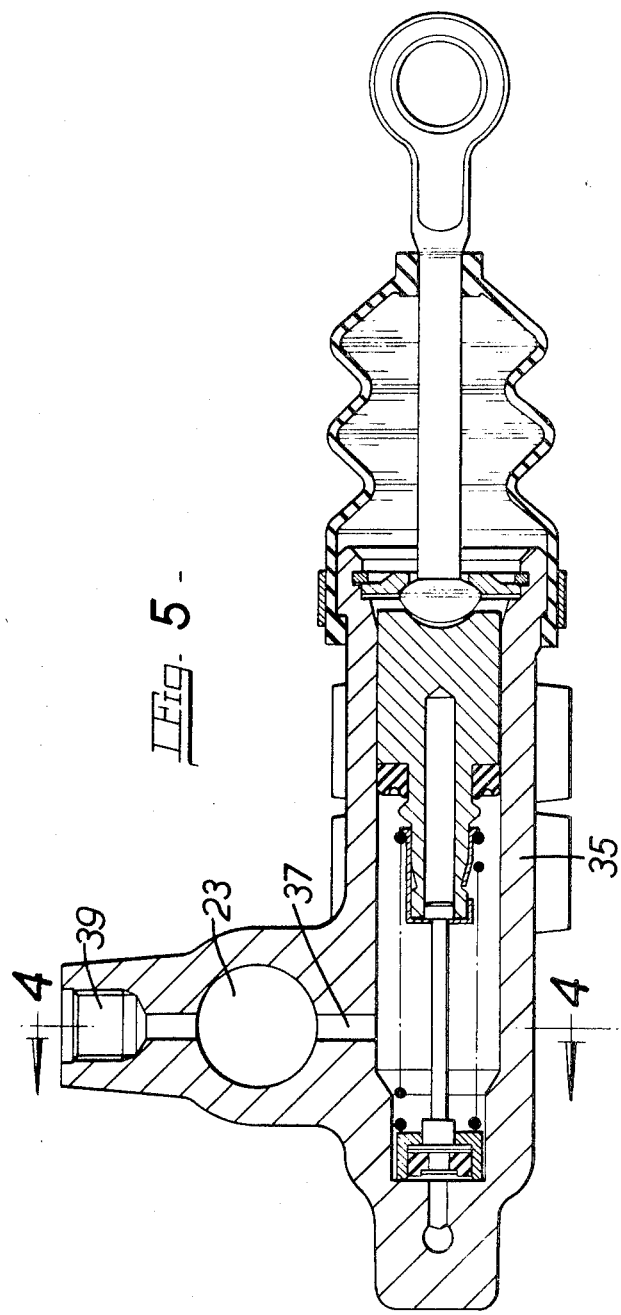

Since practical embodiments of our invention are illustrated by way of example in the accompany drawings in which:

FIG. 1 is a diagram of a braking system incorporating our improved compensating cylinder, FIG. 2 is a side elevation of one form of compensating cylinder, FIG. 3 is a longitudinal section of the compensating cylinder shown in FIG. 2, FIG. 4 is a longitudinal section of a compensating cylinder forming part of a unitary assembly incorporating two master cylinders, the section being taken on the line 4—4 of FIG. 5, FIG. 5 is a section on the line 5—5 of FIG. 4, and FIG. 6 is a longitudinal section of a modified form of compensating cylinder.

In FIG. 1, brakes 10, 11 on wheels on opposite sides of a tractor or like vehicle are applied by pressure fluid from separate master cylinders 12, 13, operated by pedals 14, 15. The master cylinders have a common reservoir 16. Hydraulic fluid is fed from the master cylinders to the brakes through pipe lines 17, 18, and a compensating cylinder 19 is connected across between the pipe lines.

The compensating cylinder 19 is shown in section in FIG. 2. The pipe lines 17, 18 are respectively connected to unions 21, 22 leading into opposite ends of a stepped bore 23 in the cylinder, there being an internal shoulder 24 at the change in diameter. The smaller end of the bore has an integral closure and the other end is closed by a recessed plug 25 screwed into the end of the bore.

A piston 26 working in the smaller end of the bore is provided with an O-ring seal 27, and spigots 28, 29 of reduced diameter extend axially from opposite ends of the piston. The spigot 29 which extends into the larger end of the bore is carried through a central opening in a washer 31 which is normally held against the step or shoulder 24 by a compression spring 32 located between the washer and the closure plug 25.

A second spring 33 of less strength than the spring 32 is located between the other end of the piston and the closed end of the cylinder, and normally holds the first end of the piston against the washer 31.

An increase in the fluid pressure in the larger end of the bore relative to the pressure in the other end moves the piston to the left in FIG. 3 against the resistance of the spring 33, the spigot 29 moving throufgh the washer 31.

An increase in the fluid pressure in the smaller end of the bore 23 moves the piston to the right in FIG. 3, the piston taking with it the washer 31 which is moved away from the step or shoulder 24 against the resistance of the spring 32.

In the second case the effect of the increased pressure is assisted by the spring 33 in overcoming the resistance of the spring 32.

The axial length of the piston over the spigots is such in relation to the axial length of the cylinder that the piston can only move through a limited distance in either direction. Thus in the event of failure of a pipe line or other part of the hydraulic system on one side of the vehicle the piston can only move axially until one of the spigots abuts the adjacent end of the cylinder and the brakes on the other side of the vehicle can still be applied.

It will be appreciated that, apart from its function as a stop, the spigot 28 is not essential to the operation of the compensator and if the end of the cylinder of smaller diameter were made shorter it could be omitted.

The compensating cylinder may be a separate unit connected between pipe lines leading from the master cylinder to the brakes on opposite sides of the vehicle or it may conveniently form part of a unitary assembly with the two master cylinders as shown in FIGS. 4 and 5.

In this arrangement the axis of the compensating cylinder is at right angles to the axes of the two master cylinders 35 and 36 so that ports 37 and 38 leading into opposite ends of the compensating cylinder can communicate directly with the delivery chambers of the master cylinder and can be formed by internal passages in the assembly casting. This avoids any external pipe work and provides a neat and compact unit.

The compensating cylinder itself is exactly the same as described above with reference to FIG. 3 and the same reference numerals have been applied.

The unions 39 and 41 shown in FIG. 4 are adapted to be connected to a reservoir.

The master cylinders are of standard type and need not be described in detail.

The piston in the compensating cylinder described above is fitted with an O-ring seal. This may provide such frictional resistance to the movement of the piston that high piston return spring loads are necessary to centralise the piston when operating with a viscous mineral fluid such as is now commonly used.

To overcome this difficulty a modified form of compensating cylinder shown in FIG. 6 can be employed.

In this construction the connections from the two master cylinders are made to axial ports 45 and 46 in opposite ends of the compensating cylinder 47.

The piston 48, as in the embodiment described, above works in the smaller end of a stepped bore 49 in the cylinder and has on opposite ends axially extending spigots 51 and 52. The spigot 52 passes through a central opening in a washer 53 which is normally held by a spring 54 against the shoulder 55 in the bore at the change in diameter. A spring 56 of less strength than the spring 54 is located between the other end of the piston and the adjacent end of the cylinder.

The seal on the piston is omitted but the outer ends of the spigots are provided with rubber-faced sealing members 57 adapted to engage and close off one or other of the ports 45, 46 when the piston has reached the limit of its travel in either direction.

This will occur when only one of the master cylinders is operated or if there is a failure of a pipe line or other part of the system on one side of the vehicle.

As the piston is not provided with a seal and ordinary commercial tolerances are employed in the machining of the piston and cylinder bore there will be a certain amount of leakage past the piston under differential pressures in opposite ends of the cylinder, but if both ends of the cylinder are connected to a common reservoir this is unimportant when the two brake pedals are operated simultaneously and there is only a slight unbalance between the brakes on opposite sides of the vehicle.

While a compensating cylinder in accordance with our invention is intended primarily for use in an hydraulic braking system of the kind set forth it will be appreciated that our invention can have other applications where cross compensation or balancing is required between two hydraulic systems capable of operating simultaneously or independently.

I claim:

1. Cross compensating means for an hydraulic braking system in which fluid under pressure is supplied to the slave cylinders of brakes on wheels on opposite sides of a vehicle by separate master cylinders each actuated by its own pedal, comprising a compensating cylinder adapted to be connected at opposite ends to the outlets of the two master cylinders, a piston working in the cylinder, a stop in the cylinder for locating the piston in a substantially central position, and spring means for producing one force which force exclusively acts on one side of said piston and second spring means for producing a different force which different force exclusively acts on the opposite side of said piston to normally hold the piston in engagement with said stop.

2. Cross compensating means for an hydraulic braking system in which fluid under pressure is supplied to the slave cylinders of brakes on wheels on opposite sides of a vehicle by separate master cylinders each actuated by its own pedal, comprising a compensating cylinder adapted to be connected at opposite ends to the outlets of the two master cylinders, a stepped bore in said compensating cylinder, a piston working in the part of said bore of smaller diameter, a spigot extending axially from one end of the piston into the part of the bore of greater diameter, a washer having a central opening through which said spigot passes, an internal annular shoulder in the bore at the change in diameter, a first spring resiliently urging said washer against said shoulder, and a second oppositely acting spring of less strength than the first spring resiliently urging the piston into engagement with the washer.

3. Cross compensating means for an hydraulic braking system as in claim 2, wherein said piston has an axially extending spigot on each end, and the axial length of the piston over the spigots in relation to the axial length of the cylinder is such that the permitted axial movement of the piston in each direction is limited to a value permitting application of the brakes on one side of the vehicle in the event of failure of a pipe-line or other part of the hydraulic system on the other side.

4. Cross compensating means for an hydraulic braking system as in claim 2, wherein the compensating cylinder is combined in a unitary structure with the two master cylinders which are connected to opposite ends of the compensating cylinder by internal passages in the structure.

5. Cross compensating means for an hydraulic braking system as in claim 2 wherein the connections between the compensating cylinder and the master cylinders are formed by ports in opposite ends of the compensating cylinder and spigots extending axially from opposite ends of the piston carry on their extermities sealing members adapted to engage and close one or other of said ports on axial movement of the piston exceeding a predetermined value.

References Cited

UNITED STATES PATENTS

| 3,382,333 | 5/1968 | Ihnacik | 303—84 X |
| 3,441,318 | 4/1969 | Bueler | 303—84 X |
| 3,459,000 | 8/1969 | Oberthur | 188—152 |

DUANE A. REGER, Primary Examiner

J. J. McLAUGHLIN, Jr., Assistant Examiner

U.S. Cl. X.R.

60—54.5; 188—151, 152; 303—6